US005629684A

United States Patent [19]

Isshiki et al.

[11] Patent Number: 5,629,684
[45] Date of Patent: May 13, 1997

[54] TIMER FOR AN ELECTRICAL APPARATUS

[75] Inventors: Masao Isshiki; Taizo Kodama, both of Shizuoka, Japan

[73] Assignee: Kabushiki Kaisha Toshiba, Kawasaki, Japan

[21] Appl. No.: 345,698

[22] Filed: Nov. 21, 1994

[30] Foreign Application Priority Data

Mar. 22, 1994 [JP] Japan .................................. 6-050692

[51] Int. Cl.$^6$ .................................................. H04Q 1/00

[52] U.S. Cl. ............................... 340/825.06; 340/825.69; 340/825.22; 455/181.1; 368/12; 368/203

[58] Field of Search ......................... 340/825.69, 825.72, 340/825.06, 825.22; 368/10, 12, 107, 203; 455/181.1, 231

[56] References Cited

U.S. PATENT DOCUMENTS 3,949,240 4/1976 Saito ......................................... 368/12
4,843,384 6/1989 Ide et al. ............................ 340/825.69
5,117,714 6/1992 Ganter .
5,365,494 11/1994 Lynch ....................................... 368/10
5,446,453 8/1995 Nagamoto .......................... 340/825.69

FOREIGN PATENT DOCUMENTS 58-1194 1/1983 Japan .

*Primary Examiner*—Brian Zimmerman
*Attorney, Agent, or Firm*—Cushman, Darby & Cushman IP Group of Pillsbury Madison & Sutro LLP

[57] ABSTRACT

A timer for controlling an operation start and/or end of an electrical apparatus at a manually input operation time. The timer includes a clock having an active state and a nonactive state, which generates a current time in the active state. A reset circuit sets the clock to the nonactive state. Entering an initial time to the clock sets the clock to the active state. The timer has two operating modes. In one mode, the operation time is designated by a target time. In the other mode, the operation time is designated by a time interval. The operating mode is automatically changed based on the state of the clock. If the clock is in the active state, the operation time is designated by the target time. In the nonactive state, the operation time is designated by the time interval.

15 Claims, 13 Drawing Sheets

TIMER FOR AN ELECTRICAL APPARATUS

BACKGROUND OF THE INVENTION

1. Field of the Art

The present invention relates to a timer for controlling the operation of an electrical apparatus.

2. Description of the Related Art

A timer is conventionally used to start and/or end an operation of an electrical apparatus such as an air conditioner, TV set or VCR, when the timer reaches an operation time, which can be either an operation start time or operation end time.

There are known two types of such timers (hereafter referred to as a first type and a second type) for setting an operation time of the apparatus. One type of timer (first type) is disclosed in U.S. Pat. No. 4,843,384, which designates the operation time by inputting a target time (clock time, for example 18:00). The timer, which includes a clock, controls the apparatus when a current time of the clock reaches the target time.

In the other type of timer (second type), the operation time is designated by inputting a time interval, for example 5 hours, between the target time at which the operation of the apparatus is started or ended and an actual time when the timer is set. The second timer controls the apparatus at the end of the time interval.

The first type of timer operates on the basis of the current time of the clock. Therefore, it does not work without setting the clock. Usually, setting the clock is done by designating an initial time. The first type of timer is generally contained in a remote controller which is energized by electric power from a battery. When the power supplied from the battery fails, the clock in the timer stops counting time and the current time data of the clock is cleared. As a result, it is required to reset the clock every time the battery is replaced.

The second type of timer does not require setting the clock. However, it is troublesome for a user who is accustomed to using the first type of timer, since for the second type, it is necessary to calculate the time interval between the target time and an actual time.

There is known a modified timer having a combined function of both types of timer wherein the operation start time is designated by inputting the target time and the operation end time is designated by inputting the desired time interval. However, in the modified timer, it is required to set the clock before setting the operation start time.

SUMMARY OF THE INVENTION

It is an object of the invention to provide a timer which designates an operation time with either a target time or a time interval.

It is another object of the invention to provide a timer capable of use before setting a initial time of the clock.

It is a further object of the invention to provide a timer which automatically selects the operation to designate the operation time in response to the clock operation.

It is a still further object of the invention to provide an improved remote controller which is powered by a battery and containing a timer.

It is a still further object of the invention to provide an improved method for controlling an operation of an electrical apparatus using a timer.

To achieve the above objects, there is provided a timer for controlling an operation of an electrical apparatus. The timer includes a clock means having an active state and an nonactive state for generating a current time in the active state, and an initial time setting means for setting an initial value of the current time and for setting the clock means to the active state. The timer also includes a first controlling means for controlling the operation of the electrical apparatus while the clock means is in the active state. The first controlling means includes a first time designating means for designating a time interval, and a first time count means for counting the time interval and for controlling the operation of the electrical apparatus at the end of the interval time. The timer further includes a second controlling means for controlling the operation of the electrical apparatus while the clock means is in the nonactive state. The second controlling means includes a second time designating means for designating a target time and a second time count means for controlling the operation of the electrical apparatus when the current time reaches the target time.

There is further provided a method for controlling an operation of an electrical apparatus using a timer. The method includes the steps of providing a clock having an active state and a nonactive state for generating a current time while in the active state, inputting an initial value of the current time and setting the clock to the active state. The method also includes, when the clock is in the nonactive state, performing steps of designating a time interval, and controlling the operation of the electrical apparatus at the end of the interval time. The method further includes, when the clock means is in the active state performing steps of designating a target time, and controlling the operation of the electrical apparatus when the current time reaches the target time.

DETAILED DESCRIPTION OF PREFERRED EMBODIMENT

An embodiment of the present invention will now be explained with reference to the accompanying drawings.

Figure 1:
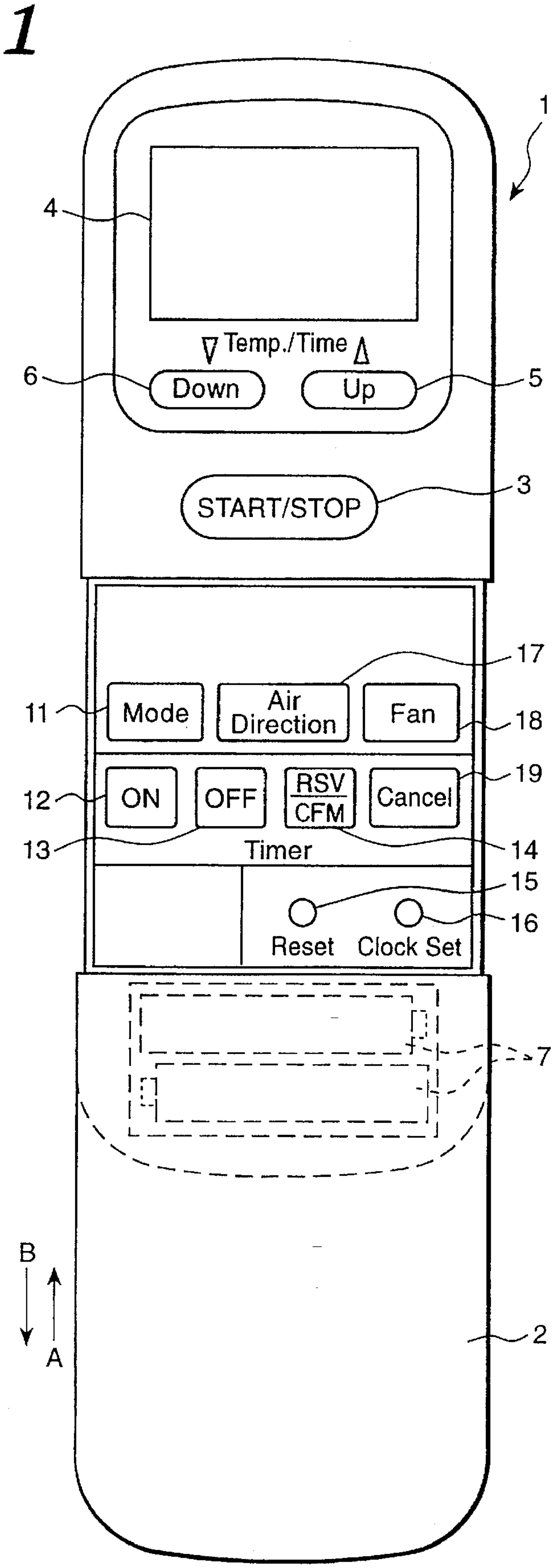
FIG. 1 is a plain view of a wireless remote controller in which timer according to the invention is contained.

FIG. 1 shows a wireless remote controller 1 having a timer according to the invention. The controller 1 is designed for use with an air conditioner (not shown). The timer of the controller 1 has a clock and functions as an operation start timer (hereafter called TMon) and operation end timer (hereafter called TMoff). The TMon starts the operation of the air conditioner at an operation start time while the TMoff ends the operation of the air conditioner at an operation end time. Both of the operation times are designated by inputting a time interval or a target time. Namely, the timer has two modes for designating the operation time. One is a target time designating mode in which the operation time is designated by the target time, for example 18:00. The other is a time interval designating mode in which the operation time is designated by the time interval for example 5 hours.

The controller 1 has an elongated body and the longitudinal lower half is covered with a slidable cover 2. A liquid crystal display 4 is provided on the upper portion of the controller 1. A start/stop button 3 for starting or stopping the operation of the air conditioner is provided on the middle upper portion of the controller 1. An Up button 5 and a Down button 6 for setting a room temperature and designating a time corresponding to an initial time used for setting the clock and an operation start or end time of the timer, are arranged between the display 4 and the start/stop button 3.

The cover 2 is removable from the controller 1. Various inner buttons 11 to 19 are exposed when the cover 2 is slid in the direction shown by the arrow B in FIG. 1, and the cover 2 fits over controller 1 by sliding the cover 2 in the direction shown by the arrow A in FIG. 1. The batteries for supplying electrical power to the controller 1 are also disposed under the cover 2. When the batteries 7 fail, the cover 2 is slid out and the batteries 7 are replaced. The inner buttons 11 to 19, except the Reset button 15, are divided into two groups, i.e. control group buttons and timer group buttons. The control group buttons, which are used for controlling the air conditioner, are the button 11 (Mode select button) for selecting the operating mode of the air conditioner, the button 17 (Air Direction select button ) for controlling the air flow direction, and the button 18 (Fan button) for selecting a power of air flow. On the other hand, the timer groups buttons which are used for controlling and setting the timer, are the button 12 (ON timer button) for starting to set the TMon,the button 13 (Off timer button) for starting to set the TMoff, the button 14 (timer RSV/CFM (Reservation/Confirmation) button) for setting the timer and for designating the operation times and for displaying the information of the timer setting to confirm, the button 19 (timer Cancel button) for cancelling the timer setting, and the button 16 (Clockset button) for designating an initial time of the clock and starting the clock operation. The Reset button 15 resets an operation the controller 1.

Figure 2:
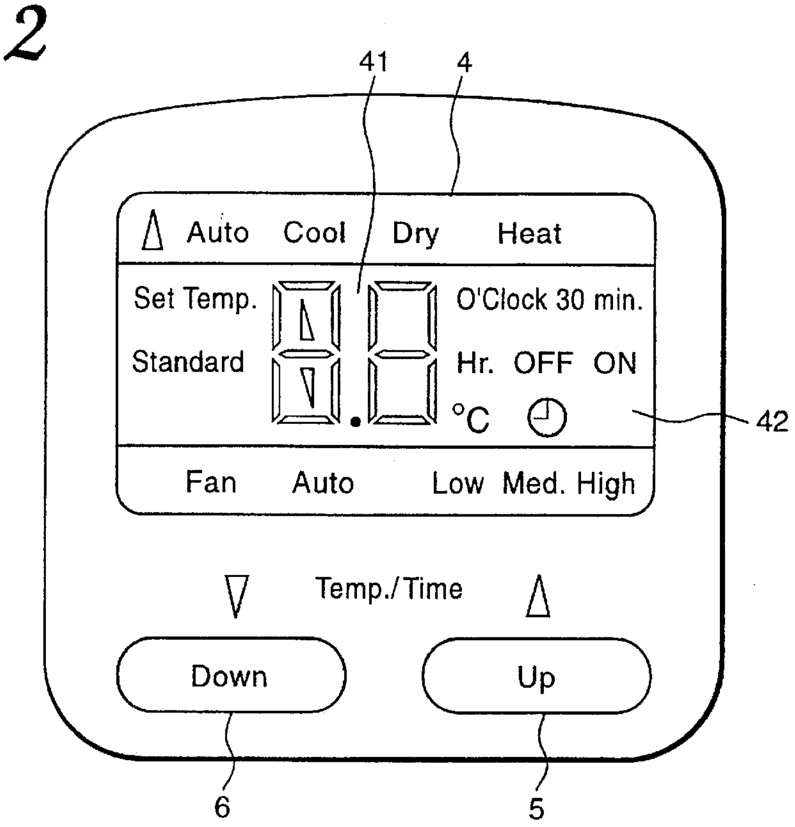
FIG. 2 is an enlarged view of a display of the controller shown in FIG. 1.

In FIG. 2, all displays on the display 4 are indicated. However, during operation, only the relevant displays will be shown on the display 4. The display 4 is divided into three portions by two horizontal lines. The middle portion of the display 4 shows the set temperature and/or the information related to the timer. The center of the middle portion is a numerical display region 41. A right side of the region 41 is an operation indication region Two 7-segments display arrangement and one period are provided in the numerical display region 41. Display region 41 displays hours and minutes with only two 7-segments display arrangement by applying a time-sharing method in order to reduce the cost and display area. However four 7-segment display arrangement could be used for displaying hours and minutes at the same time. In the operation indication region 42, various indications such as, "o'clock", "30", "min.", "Hr.", "ON", "OFF", "°C." and "timer-mark" representing an analogue clock are arranged. These indications, except for the "°C.,", are used to set the timer. The upper portion of the display 4 indicates a current operation mode of the air conditioner selected by the Mode button 11, while the lower portion indicates a current power of air flow selected by the Fan button 18.

Figure 3:
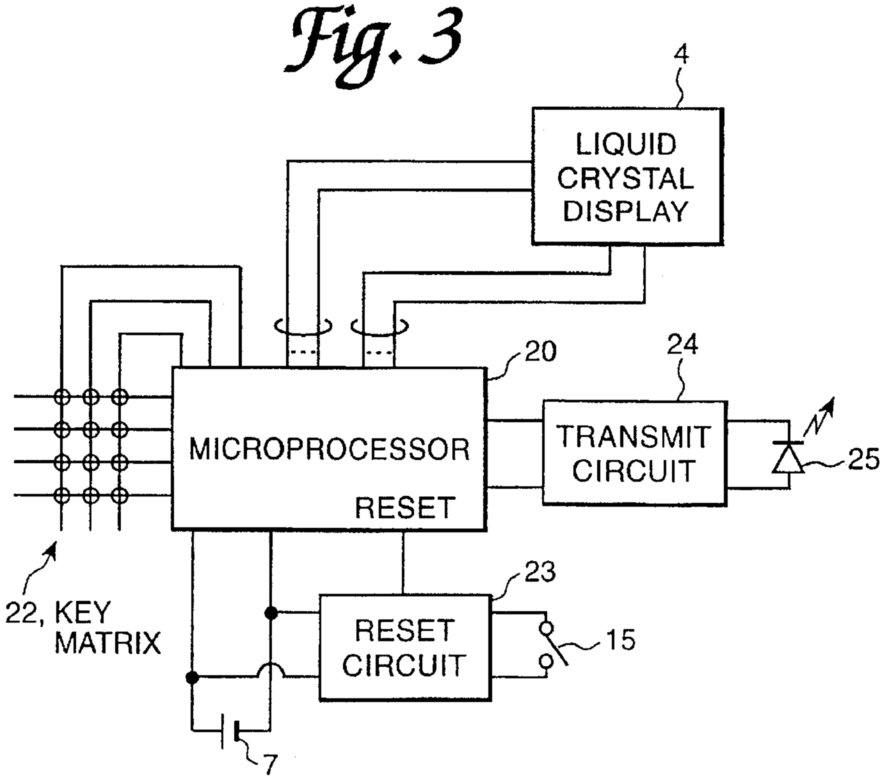
FIG. 3 is a schematic block diagram of the remote controller.
Figure 4A:
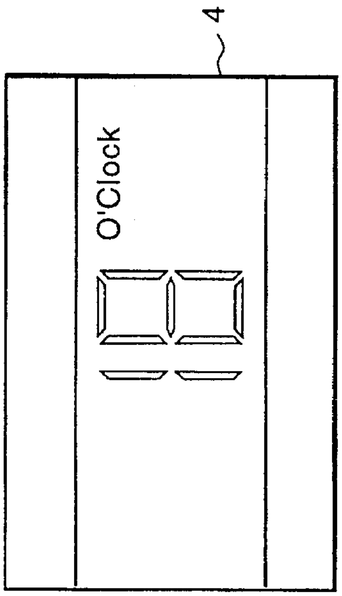
FIGS. 4(*a*) to 4(*d*) are enlarged diagrams of the display during an initial time set to a clock.
Figure 4B:
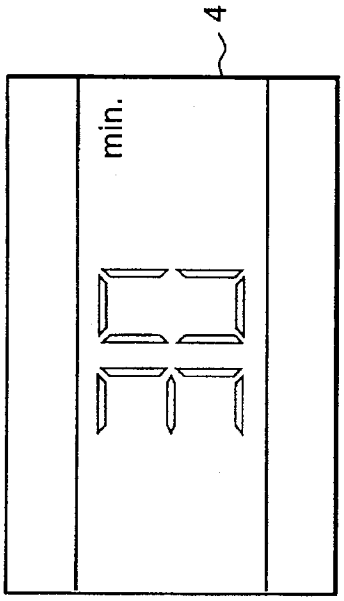
Figure 4C:
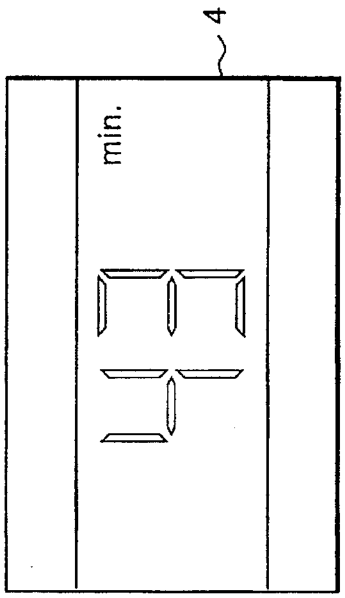
Figure 4D:
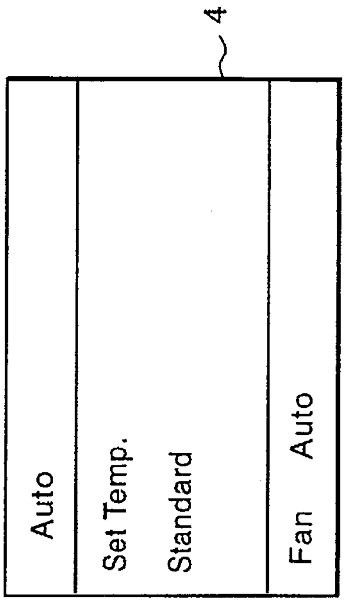
Figure 5A:
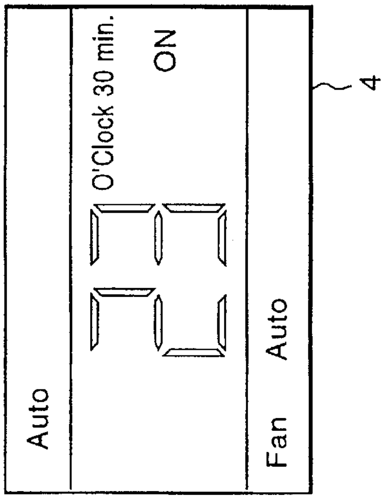
FIGS. 5(*a*) to 5(*f*) are enlarged diagrams of the display during a target time designating mode.
Figure 5B:
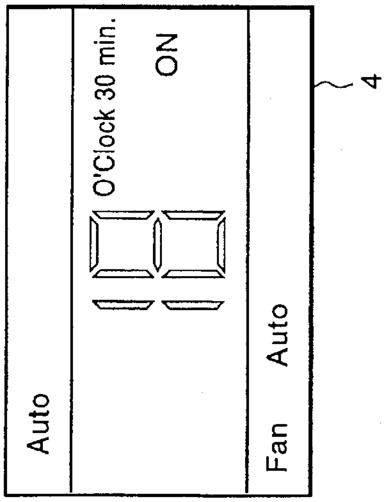
Figure 5C:
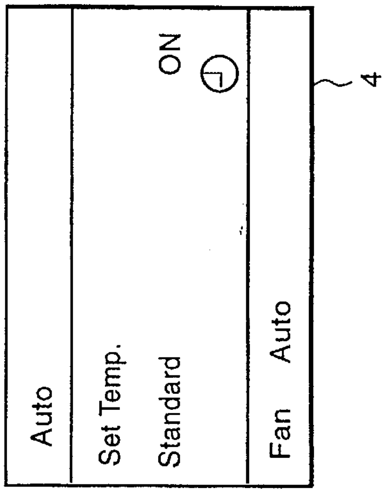
Figure 5D:
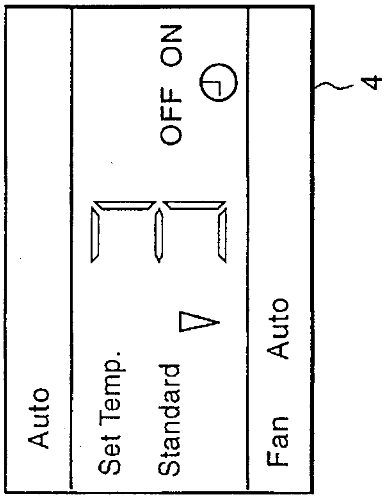
Figure 5E:
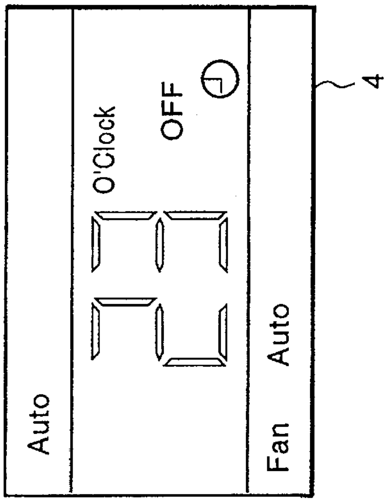
Figure 5F:
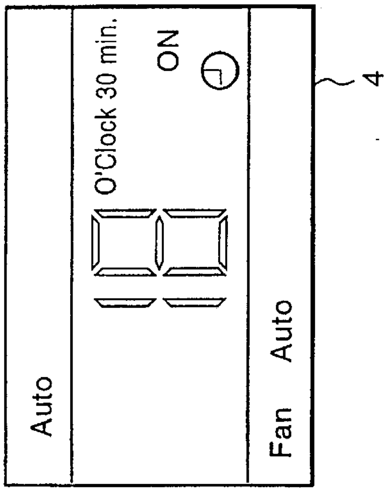
Figure 6A:
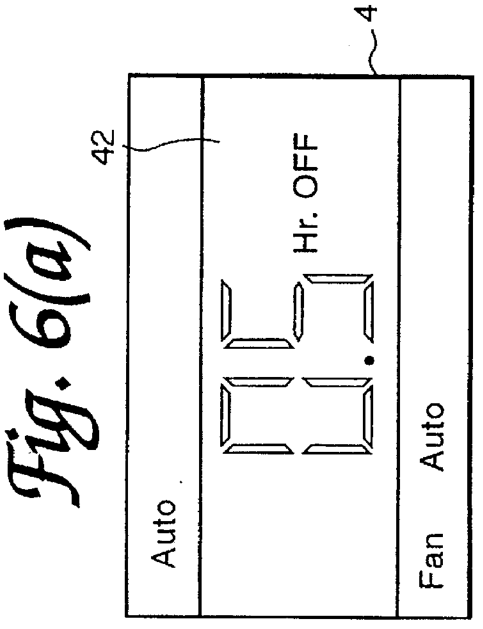
FIGS. 6(*a*) to 6(*d*) are enlarged diagrams of the display during a time interval designating mode.
Figure 6B:
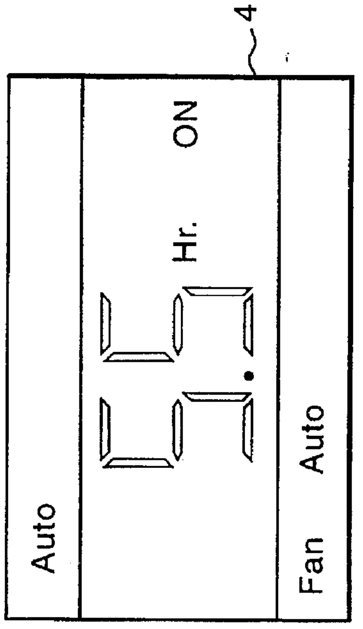
Figure 6C:
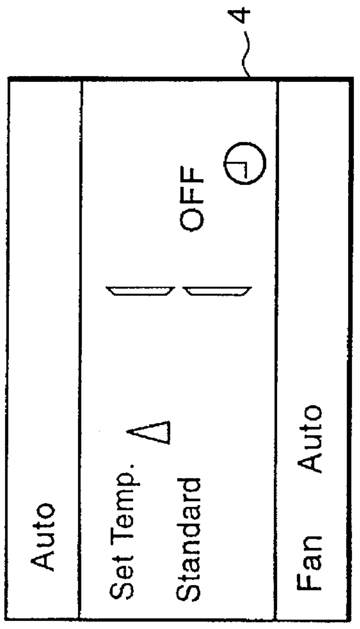
Figure 6D:
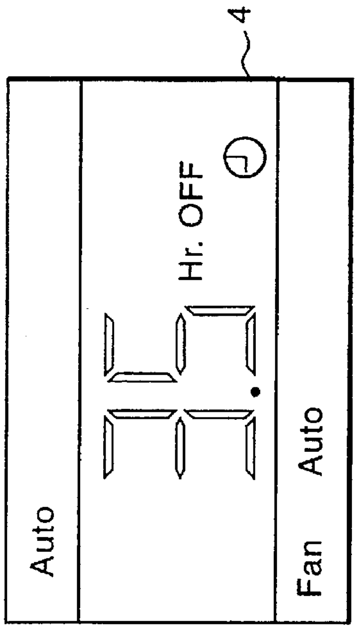

FIG. 3 is a block diagram of the remote controller 1. The controller 1 has a micro-processor 20 with a built-in timer and a clock function. The liquid crystal display 4 is controlled by the processor 20. A key matrix 22 for detecting the pushing of buttons is connected to the processor 20. A transmitting circuit 24, which has an infrared ray emitting diode 25, transmits an infrared ray signal coded by the processor 20. The batteries 7 supply electrical power to the processor 20. A reset circuit 23 is connected to a reset port of the processor 20 and generates a reset signal to reset the processor 20 upon the operation of the Reset button 15. The reset circuit 23 detects a predetermined increase of the operation voltage of the batteries 7 and also generates the reset signal upon detecting the increase when the batteries are replaced. The processor 20 is reset by the reset signal. Accordingly, when the processor 20 receives the reset signal, the clock in the processor 20 stops and the data of the times of the processor 20 is cleared.

Referring now to FIGS. 3 to 6, the general operation of the timer will be explained. The detailed operation will be explained with flow charts shown in FIGS. 7 and 8.

Clock Setting

When the batteries 7 are placed in the controller 1, the display 4 shows an initial setting data of the air conditioner as shown in FIG. 4(*d*). In this condition, the clock is in a nonactive state and does not work. In this condition, the timer is in the time interval designating mode. If the clock is set in this mode, the clock enters an active state and starts to generate the current time, and the mode of the timer changes to the target time designating mode.

The clock is set using the Clockset button 16 and the Up or Down buttons 5,6. When the Clockset button 16 is pushed, an initial "o'clock" display shown in FIG. 4(*a*) starts to flash, namely initial hour "18" in the numerical display region 41 and "O'clock" in the indication region 42 are flashed. Anyone of the numbers from "0" to "23" is displayed by pushing the Up or Down buttons 5,6. The initial hour is thus selectable.

When the Clockset button 16 is pushed after the selection of the initial hour, the initial hour displayed is designated to the initial value of a current hour of the clock. At the same time an initial hour display changes to an initial minutes display shown in FIG. 4(*b*) and an initial minutes, "30", in the region 41, and "min." in the region 42 are flashed. Anyone of the numbers from 0 to 59 is displayed by pushing the Up or Down button 5,6. Accordingly, the selection of the initial minutes is carried out by the Up or Down button 5,6. For example, 43 minutes is selected to the initial minutes in FIG. 4(*c*). After the selection of the initial minutes, when the Clockset button 16 is pushed, the initial minutes displayed is designated to the initial value of a current minutes of the clock and the display 4 returns to initial display, as shown in FIG. 4(*d*) again. Then, the clock setting is finished and the clock enters the active state, starts to count time at the initial hours and minutes and generates a current time.

Operation Start/Stop Timer Setting in Target Time Designating Mode

After setting the initial value of the current time in the clock, the timer operates in the target time designating mode while the clock is in the active state. If the On timer button 12 is pushed at the current time of the clock 23:45, the hour of the current time, "23" in the region 41 and "O'clock", "30", "min." and "ON" in the region 42 are displayed on the display 4 as shown in FIG. 5(*a*), and flashed. As long as the minutes of the current time of the clock are greater than a half hour, the "30" and "min." are displayed. Otherwise, the "30" and "min." are not displayed.

After pushing the ON button 12. the operation start time is selectable with the Up or Down button 5,6. Every time the Up or Down button 5,6 is pushed, the time displayed on the display 4 is increased or decreased by 30 minutes. FIG. 5(*b*) shows a selected operation start time of 18:30.

After selecting the operation start time, the RSV/CFM button 14 is pushed to designate the operation time and set the TMon. Upon pushing the button 14, the display 4 is as shown in FIG. 5(*c*). The "timer-mark", and "ON" indicators in the display 4 indicate that the TMon has been set. At the same time, the processor 20 calculates the time interval between the operation start time and the current time of the clock, and generates a first code signal representative of the time interval. The first code signal may includes data such as the set temperature. The first code signal from the processor 20, is transmitted in the form of a infrared ray signal from the light emitting diode 25, and the operation of the air conditioner after receiving the first code signal is as the same as disclosed in U.S. Pat. No. 4,843,384.

Furthermore, the processor 20 counts the time interval, and at the end of the time interval, the processor 20 transmits a second code signal to start the operation of the air conditioner, so that, if the air conditioner fails to receive the first code signal, the air conditioner is started to operate by the second code signal.

The TMon starts into the operation of the air conditioner, the room temperature is controlled to a set temperature adjusted before setting the TMon.

The manner in which TMoff is set is substantially the same as that used to set TMon as described above, only difference resides in the use of the Off button 13 and the indicator "OFF".

Confirmation of the Time Set in Target Time Setting Mode

It is possible to confirm each setting time of the TMon and the TMoff on the display 4.

Referring now to FIG. 5(*d*), the display 4 indicates that both TMon and TMoff have been set. The display 4 also shows that a set temperature has been set 3 degrees lower than a standard temperature. In this condition, when the RSV/CFM button 14 is pushed, the display 4 changes to display one of the set times, or the operation start time and operation end time. In FIG. 5(*e*), the display 4 shows the operation end time 23:00. If the RSV/CFM button 14 is pushed again, then the display 4 changes to show the operation start time 18:30 as shown in FIG. 5(*f*). The display 4 selectively displays one of the operation times closer to the current time of the clock, when the RSV/CFM button 14 is pushed (the first time). The second time the RSV/CFM button 14 is pushed, the rest of the operation time is displayed. When the RSV/CFM button 14 is pushed a third times, the display 4 shows to initial display as shown in FIG. 5(*d*).

If one operation time has been set, either TMon or TMoff is performed, if the RES/CFM button 14 is pushed twice in this instance, the display 4 returns to show the initial display.

Operation Start/Stop Time Setting in Time Interval Designating Mode

When the batteries 7 are initially placed or replaced in the remote controller 1 the Reset button 15 is pushed, the reset circuit forcibly sets the clock to the nonactive state. In this condition, the timer works in the interval time designating mode until the clock enters the active state, or the initial value of the current time is set in the clock.

In this mode, if the OFF button 13 is pushed, the display is as shown FIG. 6(*a*) and the "0.5", "Hr.", and "OFF" start to flash. The "0.5" in the display region 41 means that the air conditioner stops when 30 minutes elapse after the RES/CFM button 14 is pushed. The time interval, is selectable from 0.5 through 24 using the Up or Down button 5,6. The time interval is incremented by 0.5 from 0.5 through 10, while it's incremented by 1 from 10 through 24 when the Up button 5 is pushed. Similarly, the time interval is decremented by 0.5 or 1 with the Down button 6.

Upon the operation of the RES/CFM button 14, the operation time is designated to the timer as TMoff. At the same time, the "timer-mark". "OFF" and the set temperature are displayed on the display 4, as shown in FIG. 6(*c*).

Instead of pushing the OFF button 13, if the ON button 12 is pushed, a display 4 shown in FIG. 6(*b*) appears. The display on the display 4 means the air conditioner starts 5.5 hours after the RES/CFM button 14 is pushed. The timer operates as TMon.

Confirmation of the Time Set in Time Interval Designating Mode

Confirmation that the time interval has been set to TMon and/or TMoff can be seen on the display 4 with the RSV/CFM button 14 as described above in the target time designating mode.

In FIG. 6(*c*), the display 4 shows that the off time has been set,the set temperature of the air conditioner is 1 degrees higher than the standard temperature. In this condition, if the RES/CFM button 14 is pushed, the display 4 changes to that shown in FIG. 6(*d*). In FIG. 6(*d*), the display 4 shows the time interval designated to TMoff is 3.5 hours. Namely, the operation stop time is 3.5 hours after TMoff setting. If the RES/CFM 14 is pushed twice in this instance, the display 4 returns to the initial condition as shown in FIG. 6(*c*).

If both timers have been set, the display 4 displays the shorter time interval, when the the RSV/CFM button 14 is pushed the first time. When the RSV/CFM button 14 is pushed at the second time, the longer interval time is displayed. After that, when the RSV/CFM button 14 is pushed the third time, the display 4 returns to the initial condition.

Program for the Timer Operation

Figure 7:
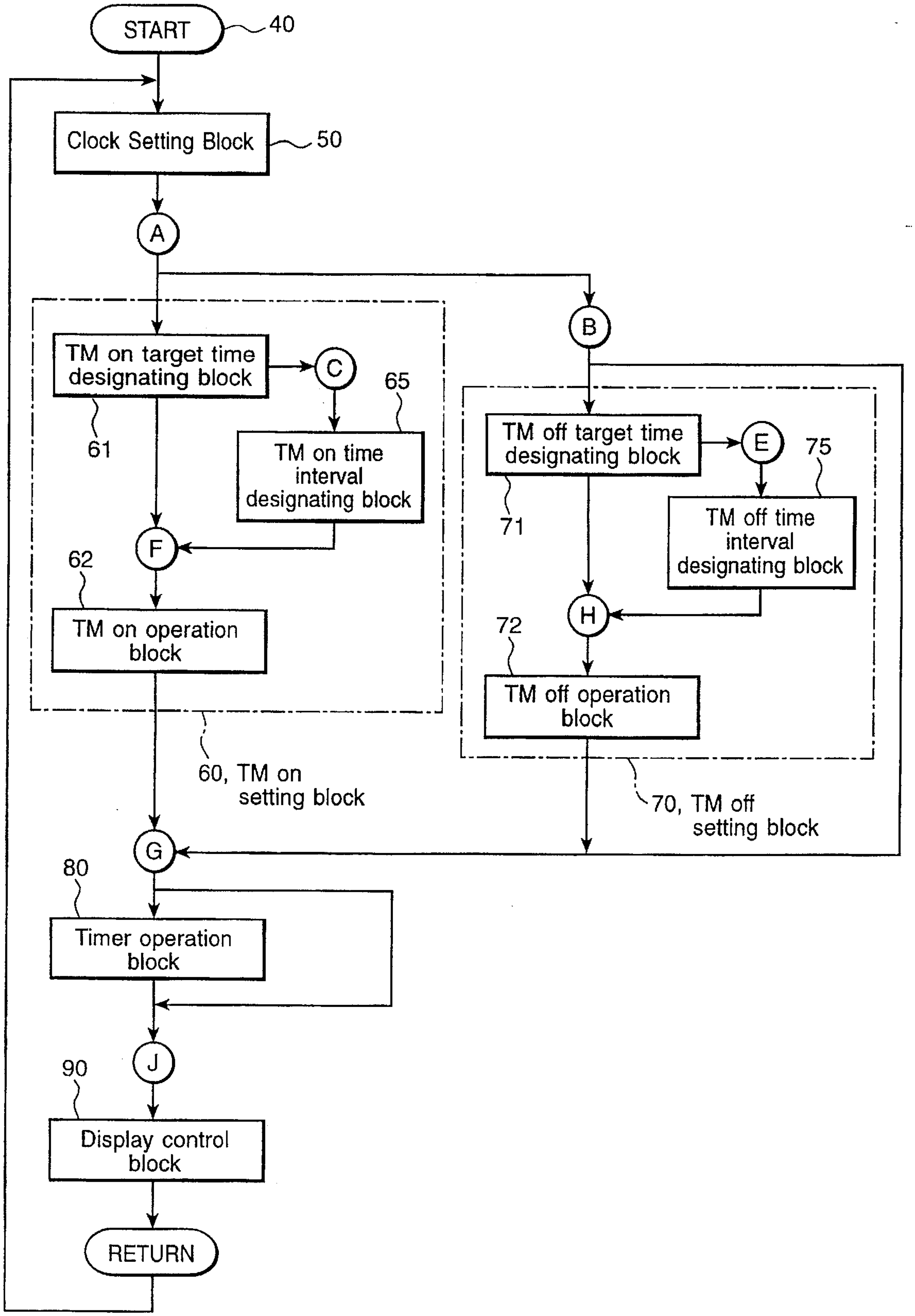
FIG. 7 is a flow chart showing the operation of a microprocessor in the remote controller.
Figure 8A:
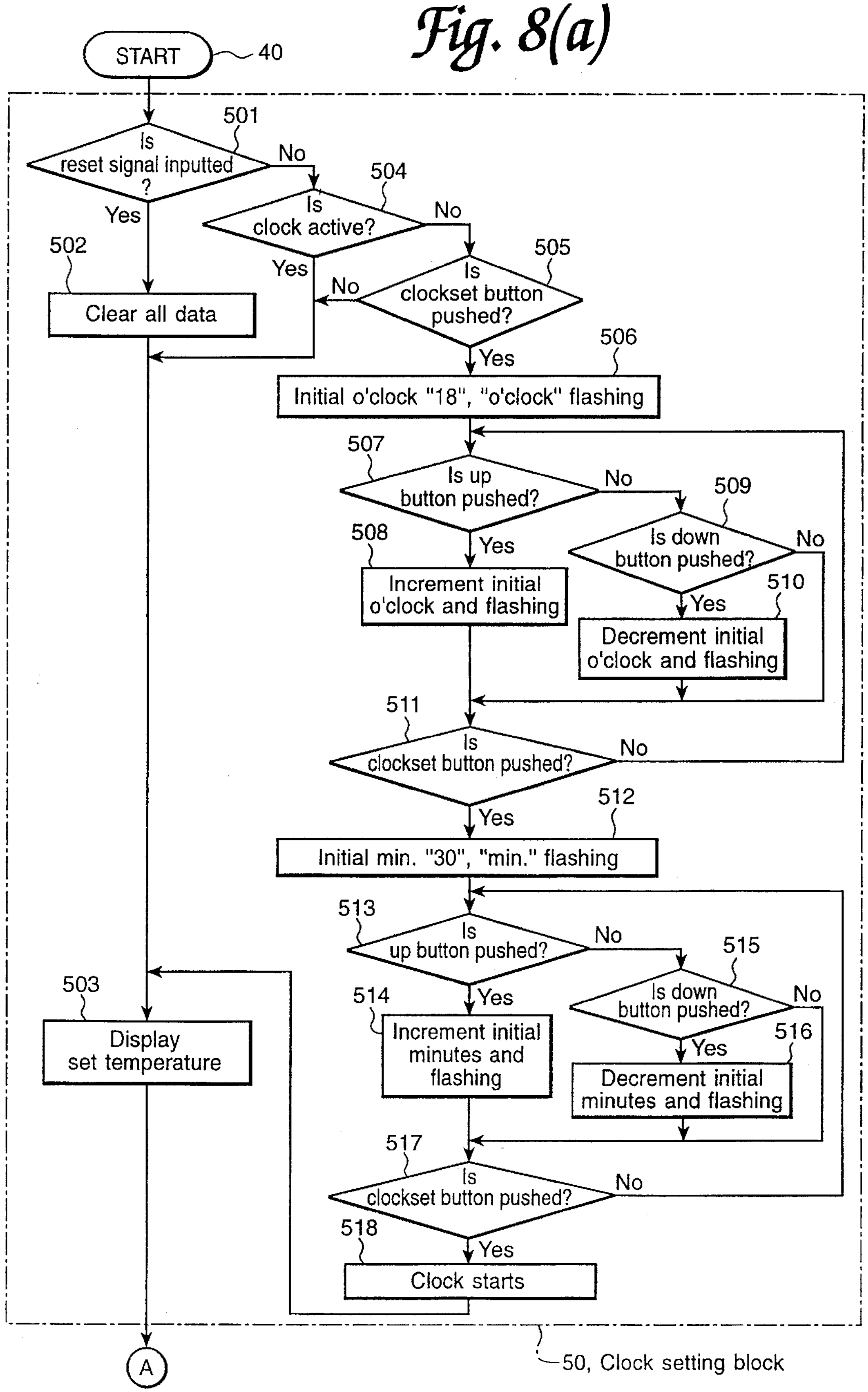
FIGS. 8(*a*) to 8(*g*) are detail flow charts shown in FIG. 7.
Figure 8B:
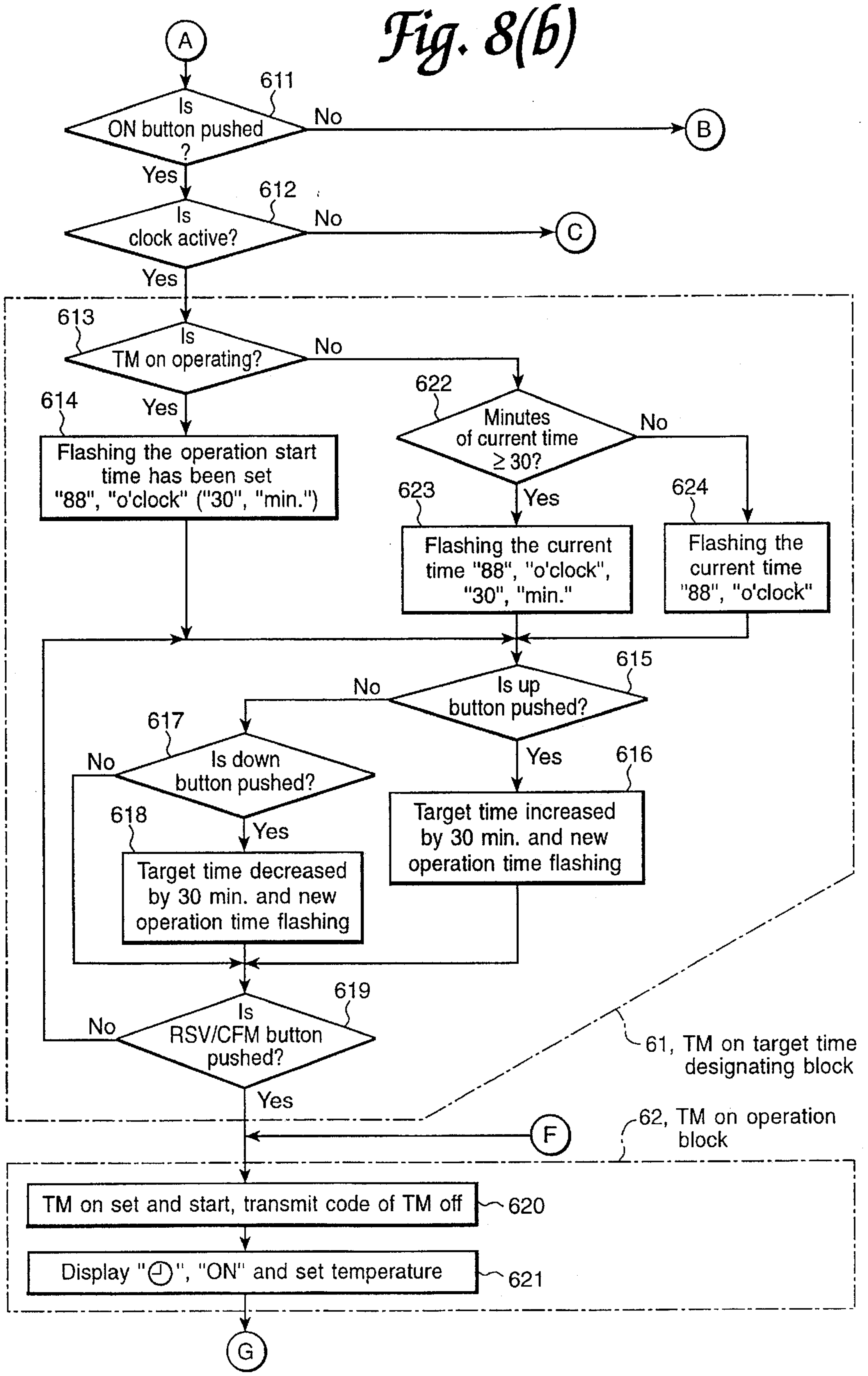
Figure 8C:
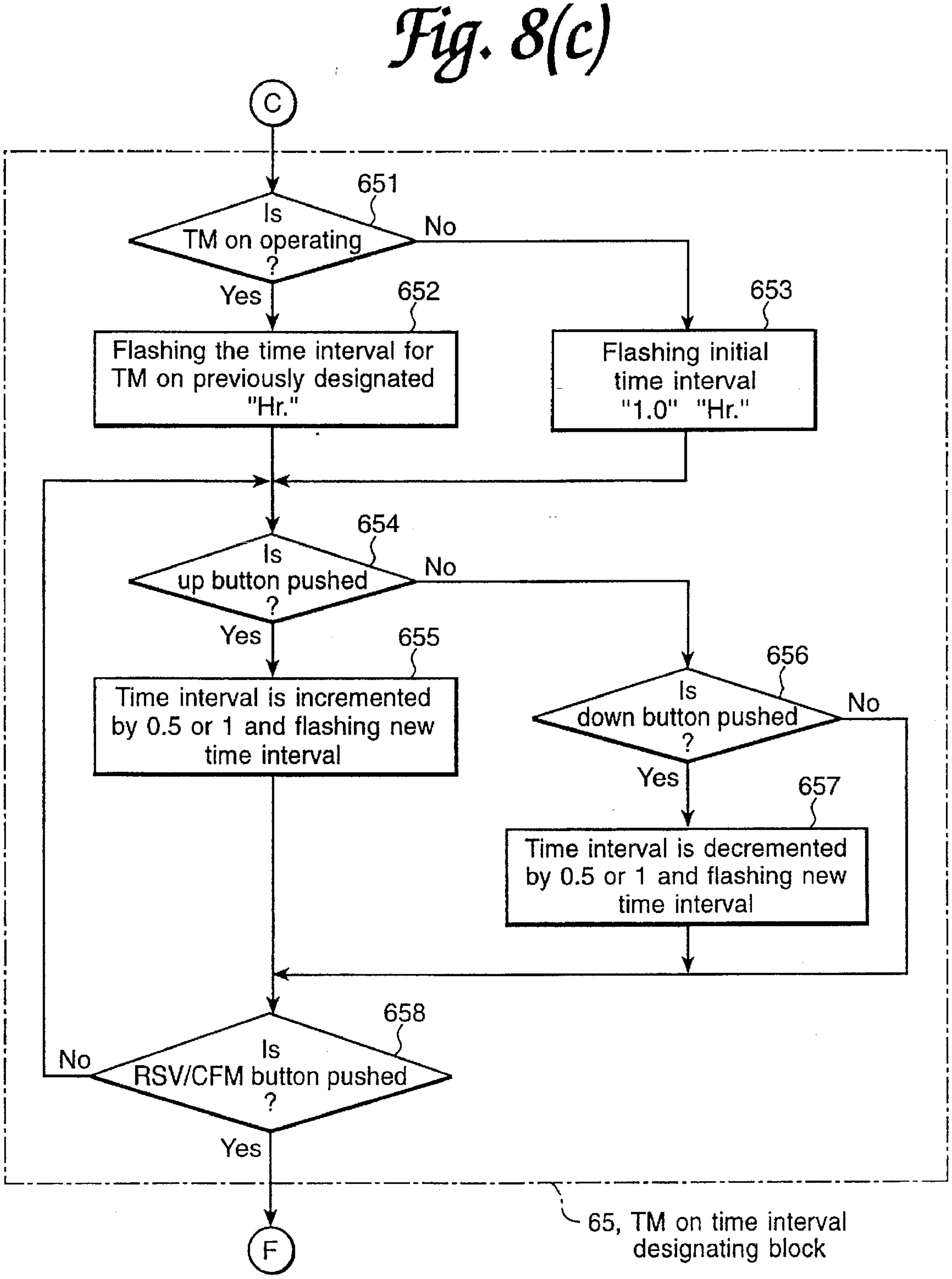
Figure 8D:
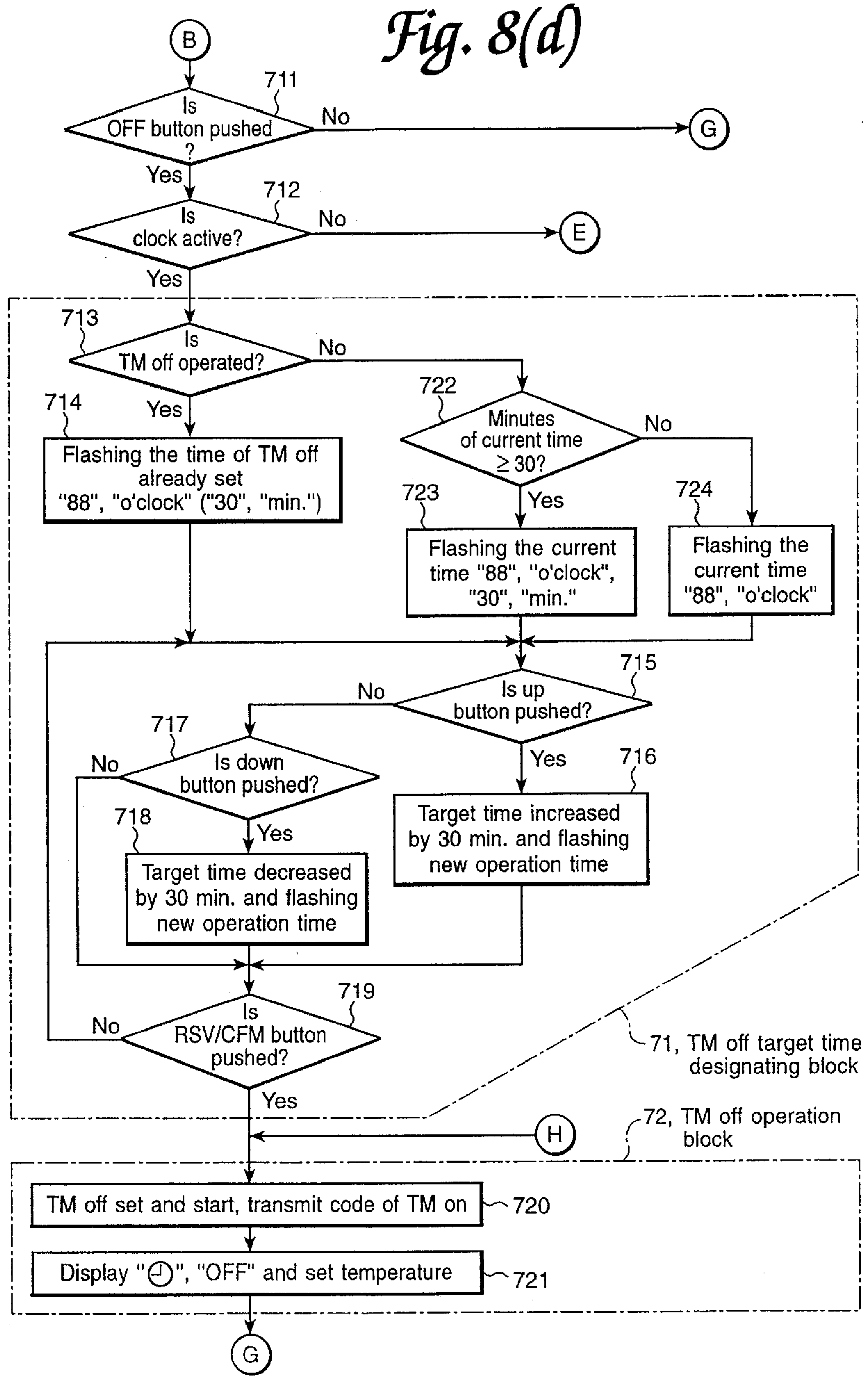
Figure 8E:
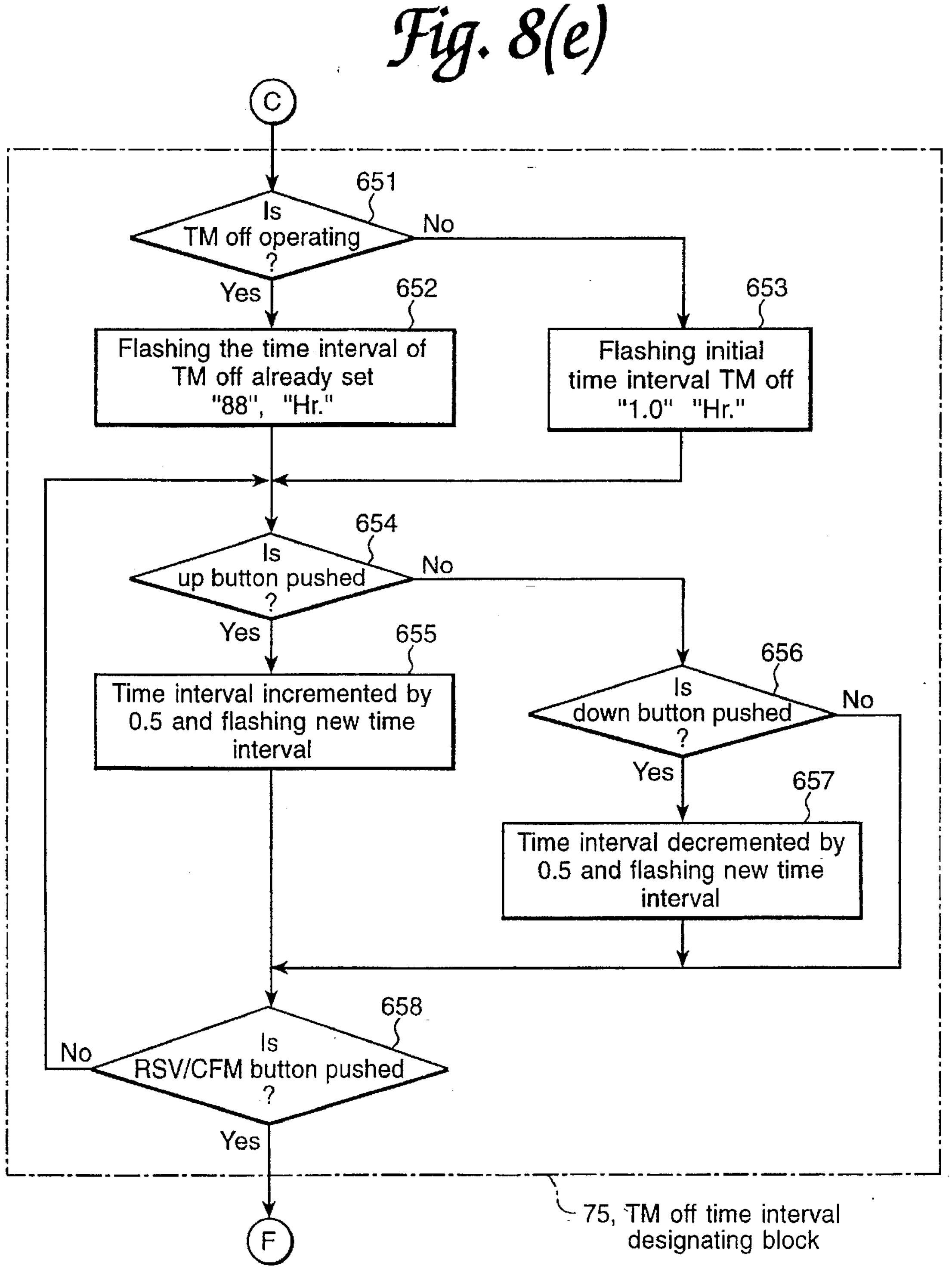
Figure 8F:
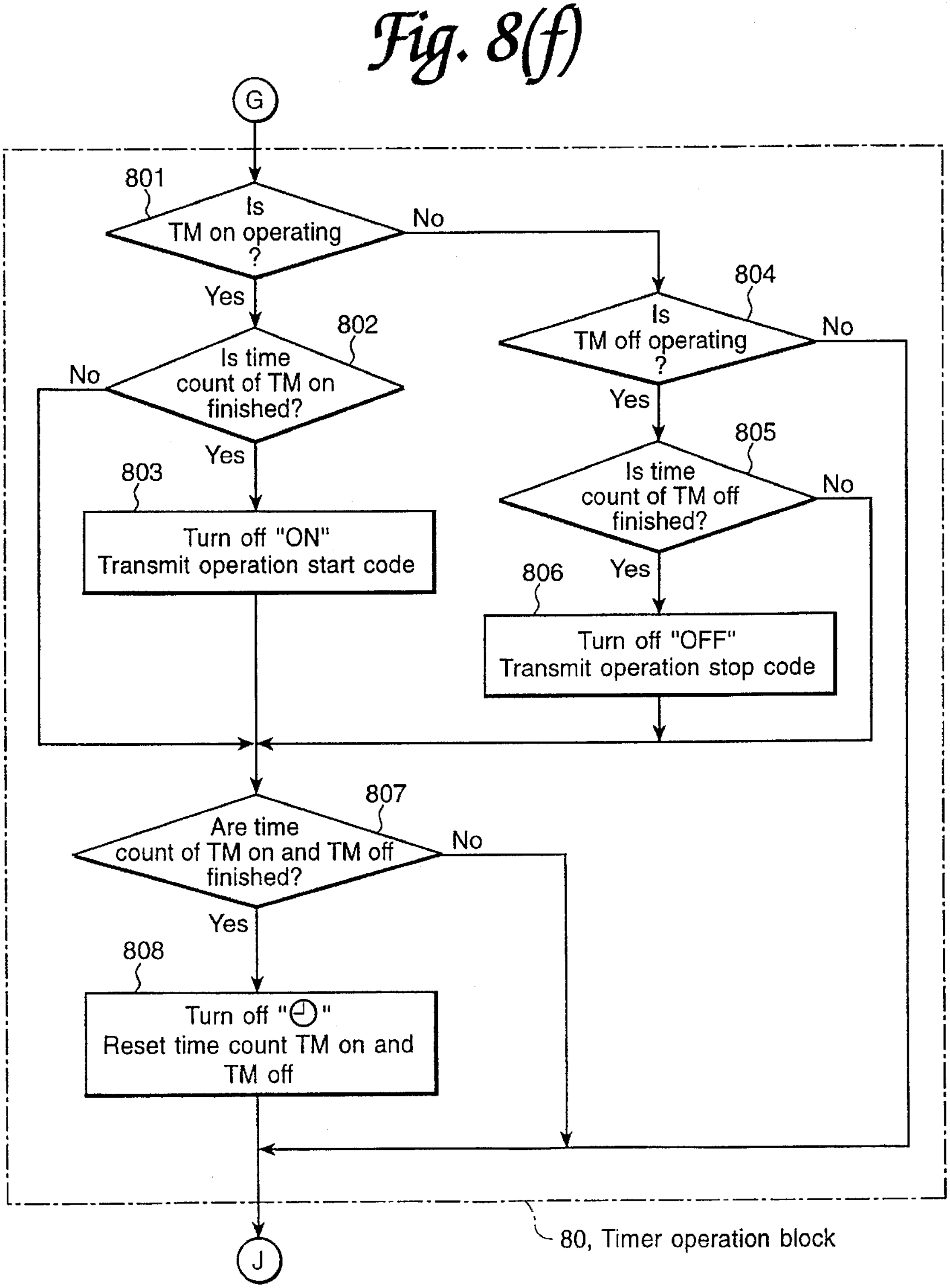
Figure 8G:
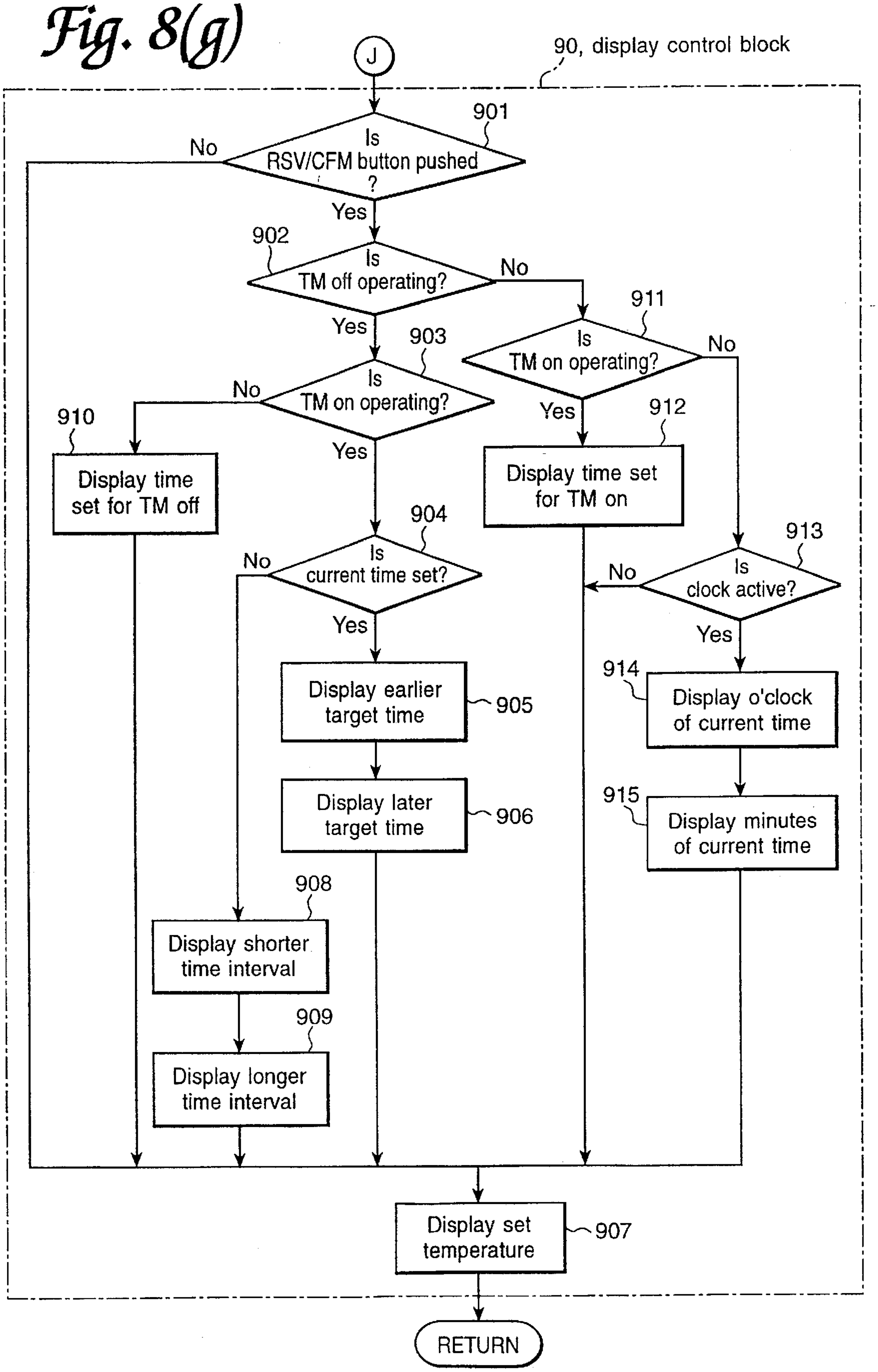

An operation of the micro-processor 20 in the controller 1 is shown in FIG. 7. The detailed flow chart of FIG. 7 is shown in FIGS. 8(*a*) to 8(*g*).

In a clock setting block 50, the clock of the timer is set or reset. If the clock of the timer is set, the clock is set to the active state, while if the clock is reset, the clock is set to the nonactive state. A TMon designating block 60 in which the TMon is set, includes a TMon target time designating block 61, a TMon time interval designating block 85, and a TMon operation block 62. A TMoff designating block 70, in which the TMoff is set, includes a TMoff target time designating block 71, a TMoff time interval designating block 75, and a TMoff operation block 72. After setting the TMon and/or TMoff in block 60 and/or 70, the timer is controlled in a timer operation block 80. The display 4 is controlled in a display control block Referring now to FIG. 8(*a*), in a first step 501, inquiry is made as to whether the reset signal, which is generated when Reset button 15 is pushed or batteries 7 are replaced, is input from the reset circuit 23 (shown in FIG. 3). If YES, a program installed in the processor 20 clears all data (step 502). Therefore, the clock in the processor 20 is set to the nonactive state in this step, and a set temperature of the air conditioner is displayed on the screen of the display 4 (step 503).

If the NO path is taken in step 501, inquiry is made in a step 504 as to whether the clock is in activate state, namely whether the initial time of the clock has been set. If YES, the step 503 is performed. If NO, inquiry is made in a step 505 as to whether the Clockset button 16 is pushed. If the Clockset button 16 is pushed in the step 505, steps 506 through 517 for setting the clock are performed. The steps 506 through 511 are an initial hour adjusting and setting steps, while steps 512 through 517 are an initial minutes adjusting and setting steps. The initial hour and initial minutes are used the initial value of the current time of the clock. Namely, the clock generates a current time which starts from the initial time inputted in these steps.

In the step 506, an initial hour "18" and an indication "o'clock" on the display 4 (as shown in FIG. 4(*a*)) start to flash. After performing in the step 506, inquiry is made in the step 507 as to whether the Up button 5 is pushed. If the Up button 5 is pushed, the YES path is taken and the initial hour displayed on the display 4 incremented by 1 hour and the new initial hour starts to flash on the display 4 (step 508). If the NO path is taken in step 507, inquiry is made in step 509 as to whether the Down button 6 is pushed. If the Down button 6 is pushed, the initial hour displayed is decremented by 1 o'clock and the new initial hour starts to flash (step 510). After the steps 508 and 510, inquiry is made in the step 511 as to whether the Clockset button 16 is pushed. Unless the Clockset button 16 is pushed, the flow returns to the step 507 and the adjusting of the initial o'clock of the current time is continued.

After performing the adjusting of the initial hour, if the Clockset button 18 is pushed, the initial minutes setting starts. If YES in the step 511, the initial minutes "30" in the region 41 and "min." is displayed (as shown in FIG. 4(*b*)) and start to flash in the step 512. In the step 513, inquiry is made as to whether the Up button 5 is pushed. If YES, the initial minutes displayed on the display 4 is incremented by 1 minute and the new initial minutes is flashing (step 514). Unless the Up button 5 is pushed, or NO path is taken in the step 513, inquiry is made as to whether the Down button 6 is pushed (step 514). If the Down button 6 is pushed, or YES path is taken in the step 515, the initial minutes displayed is decremented by 1 minute and the new initial minutes is flashing (step 516).

In the step 517, inquiry is made as to whether the Clockset button 16 is pushed. Unless the Clockset button 16 is pushed, the flow returns to the step 513, so that, the adjustment of the initial minutes of the current time is continued. If the YES path is taken in the step 517, the initial time setting is completed and the clock becomes the active state, and starts it's operation (step 518). The flow then goes to the step 503.

After setting the clock in the block 50, the flow goes to a step 611 in FIG. 8(*b*). In the step 611, inquiry is made as to whether the ON button 12 is pushed. If NO, or TMon time is not needed to designate, the flow goes to a step 711 (FIG. 8(*d*)). If YES, inquiry is made in a step 612 as to whether the clock is in the active state. In the step 612, if the clock is in the nonactive state because the initial time has not been set to the clock, the flow goes to a step 651 (FIG. 8(*c*)) of the TMon time interval designating block 65. On the other hand, if the initial time of the clock has been set, or the YES path is taken in step 612, the flow goes to the TMon target time designating block 61. Thus the decision at the step 612 activates the sequence of operations of the time interval designating block 65 or the target time designating block 61.

In the first step of the block 61, inquiry is made as to whether the TMon is operating (step 613). If YES, the target time previously set is displayed on the display 4 (as shown in FIG. 5(*a*)) and is flashed (step 614). The target time flashed on the display 4 is used as an initial time of the TMon time, however it can be changed. On the other hand, the NO path is taken in step 613, the current time of the clock is used as the initial time of the TMon time. In a step 622, inquiry is made as to whether the minutes of the current time is more than 30 minutes. If YES, the hour of the current time is flashed in the region 41 and the indications "o'clock", "30" and "min." are also flashed (step 823). If the NO path is taken in the step 822, the hour of the current time and "o'clock" are flashed (step 624).

After step 614, 623 or 624, the flow goes to a step 815. In the step 615, inquiry is made as to whether the Up button 5 is pushed. If YES, the target time displayed is incremented by 30 minutes, and the new target time is displayed and flashed on the display 4 (step 618). If the NO path is taken in a step 615, inquiry is made in step 617 as to whether the Down button 8 is pushed. If the YES path is taken at the step 617, the target time is decremented by 30 minutes, and the new target time is displayed and flashed on the display 4 (step 618). If the NO path taken in step 617, the flow goes to a step 619.

In the step 619, inquiry is made as to whether the RSV/CFM button 14 is pushed. If YES, the flow goes to the TMon operation block 62. In a step 620, the target time flashed On the display 4 is designated to the TMon time and the TMon is set. The code signal representative of the target time is transmitted to the air conditioner from the diode 25. The clock starts counting time toward TMon. In a step 621, the indicators "timer-mark", "ON" and the set temperature are displayed on the display 4 (as shown in FIG. 5(*c*)). If the NO path is taken in step 819, the flow returns to the step 615.

FIG. 8(*c*) is the detailed flow chart of the TMon time interval designating block 65. In a first step 651 of the block 65, inquiry is made as to whether the TMon is operating. If YES, the hour of the time interval previously designated to the TMon is displayed (as shown in FIG. 6(*b*)) and flashed. The indicator "Hr." is also flashed (step 652). The time previously set is used as an initial value for changing the time interval for the TMon. If the TMon time has not previously set, the NO path is taken in a step 651. In this case, "1.0", and "Hr." are flashed (step 653). The "1.0" displayed on the display 4 is used as an initial value for designating the time interval to the TMon.

Inquiry is made in a step 654 as to whether the Up button 5 is pushed. If YES, the time interval displayed is incremented by 0.5 hour or 1 hour and the new time interval is displayed and flashed on the display 4 (step 655). If the NO path is taken in the step 654, inquiry is made in step 656 as to whether the Down button 6 is pushed. If YES, the time interval displayed is decremented by 0.5 hour or 1 hour and the new time interval is displayed and flashed (step 657). In the steps 655 or 657, as long as the time interval is between 0.5 and 10, the time interval is incremented or decremented by 0.5, while the time interval is between 10 and 23, the time interval incremented or decremented by 1.

If neither button 5 nor 6 is pushed, the flow goes to step 658 through the steps 654 and 656. In the step 658, inquiry is made as to whether the RSV/CFM button 14 is pushed. If YES, the flow goes to the step 620 of the TMon operation block 62. In the 620, the interval time displayed is designated to the TMon time, and the TMon starts it's operation as above described. If NO, in the step 658, the flow returns to the step 654.

FIG. 8(*d*) is the detailed flow chart of the TMoff target time designating block 71 and the TMoff operation block 72. FIG. 8(*e*) is the detailed flow chart of the TMon time interval designating block 75. These flow charts shown in FIGS. 8(*d*) and 8(*e*) are substantially the same to those of FIGS. 8(*b*) and 8(*c*) if TMoff and "off" are replaced TMon and "on", respectively, therefore no explanation is provided.

Referring now to FIG. 8(*f*) the detailed flow chart of the timer operation block 80 is explained. Inquiry is made in a step 801, as to whether the TMon is operating. If YES, another inquiry is made in a step 802 as to whether time count of the TMon is completed. If YES, the indicator "ON" on the display 4 is turned off. A code signal for starting the air conditioning operation is transmitted from the remote controller 1 to the air conditioner (step 803). If the NO path is taken in the step 801, the flow goes to a step 804. In the step 804,inquiry is made as to whether the TMoff is operating. If YES, inquiry is made in a step 805 as to whether time count of the TMoff is completed. If YES, the indicator "OFF" is turned off, and a code signal for ending the operation of the air conditioner is transmitted (step 806).

If the NO path is taken in the steps 802, 804 or 805, flows go to a step 807. In the step 807, inquiry is made as to whether both of time count of the TMon and TMoff, finished. If YES, the indicator "timer-mark" is turned off, and both of the time count for the TMon and TMoff are reset (step 808). After the step 808 or if the NO path is taken in the step 807, the flows go to the display control block 90.

FIG. 8(*g*) is the detailed flow chart of the display control block 90. The flow chart is used for confirming the TMon time and/or the TMoff time. In a first step 901 of the display control block 90, inquiry is made as to whether the RSV/CFM button 14 is pushed. If YES, another inquiry is made in a step 902 as to whether the TMoff is operating. If YES, the flow goes to 903. In the step 903, inquiry is made as to whether the TMon is operating. If both of the TMon and TMoff are operating, the flow goes to a step 904. In the step 904, inquiry is made as to whether the clock is in the active state. If the YES path is taken in the step 904, either one of the target times designated to the TMon or the TMoff which comes earlier from the current time is chosen and displayed on the display 4 upon pushing the RSV/CFM button 14 (step 905). Then the rest of the target time is displayed on the display 4 (step 906).

If the NO path is taken in the step 904, the operation times designated to the TMon and the TMoff have been set by time intervals, In the step 908, either one of the designated time intervals which has a smaller time interval than the others is displayed on the display 4. Then the rest of the time interval is displayed on the display 4 (step 909).

If the NO path is taken in the step 903, the operation time designated to the TMoff is displayed (step 910). In any event that the operation end time is set by the target time or by the time interval.

If the NO path is taken in the step 902, the flow goes to a step 911. In the step 911, inquiry is made as to whether the TMon is operating, If YES, the operation start time is displayed (step 912). If NO, in the step 911, namely both of timers, the TMon and the TMoff, are not set, inquiry is made in a step 913 as to whether the clock is in the active state. If YES, the o'clock of the current time of the clock is displayed on the display 4 (step 914). After the step 914, the minutes of the current time is displayed on the display 4 (step 915).

In the steps 905, 906, 908, 909, 910, 914 and 915, display 4 is designed to show information on it's screen for about 5 seconds in order to confirm the information.

At the end of steps 909, 906 and 915, the display returns to initial condition, displaying the set temperature (step 907).

After the step 907, the flow returns to the start step 40. The program is continuously running until the power of the batteries 7 is dropped to a pre-determined level at which the processor 20 does not operate.

Many changes and modifications in the above described embodiment can be carried out without departing from the scope of general inventive concept as defined by the appended claims and their equivalents.

What is claimed is:

1. A timer for controlling an operation of an electrical apparatus, comprising:

a) a clock having an active state in which the clock is set to an initial value and operative therefrom and a nonactive state in which the clock is not provided with an initial value, the clock generating a current time in the active state;

b) initial time setting means for setting the initial value for the current time of the clock so as to set the clock in the active state; and c) controlling means for controlling the operation of the electrical apparatus, comprising:

first time designating means for designating a time interval;

first time counting means for counting toward an end of the time interval and for controlling the operation of an electrical apparatus at the end of the time interval;

second time designating means for designating a target time;

second time counting means for controlling the operation of the electrical apparatus responsive to the current time corresponding to the target time; and activating means for operating the timer in a first mode, wherein the first time designating means and the first time counting means are activated, responsive to the clock being in the nonactive state and for operating the timer in a second mode, wherein the second time designating means and the second time counting means are activated, responsive to the clock being in the active state.

2. A timer for controlling an operation of an electrical apparatus, comprising:

a) a clock having an active state in which the clock is set to an initial value and is operative therefrom and a nonactive state in which the clock is not set to an initial value, the clock generating a current time in the active state;

b) initial time setting means for setting the initial value so as to set the clock in the active state;

c) first controlling means for controlling the operation of the electrical apparatus, comprising:

first time designating means for designating at time interval; and first time counting means for counting toward an end of the time interval and for controlling the operation of the electrical apparatus at the end of the interval time;

d) second controlling means for controlling the operation of the electrical apparatus, comprising:

second time designating means for designating a target time; and second time counting means for controlling the operation of the electrical apparatus responsive to the current time corresponding to the target time;

e) activating means for operating the timer in a first mode, in which the first controlling means is activated, responsive to the clock being in the nonactive state and for operating the timer in a second mode, in which the second controlling means is activated responsive to the clock being in the active state.

3. A timer for controlling an operation of an electrical apparatus, comprising:

a) a clock having an active state in which the clock is set to an initial value and is operative therefrom and a nonactive state in which the clock is not set to an initial value, the clock generating a current time in the active state;

b) initial time setting means for inputting the initial value so as to set the clock in the active state;

c) first controlling means for controlling the operation of the electrical apparatus responsive to the clock being in the nonactive state, comprising:

first time designating means for designating a time interval; and first time counting means for counting toward an end of the time interval and for controlling the operation of the electrical apparatus at the end of the interval time;

d) second controlling means for controlling the operation of the electrical apparatus responsive to the clock being in the active state, comprising:

second time designating means for designating a target time; and second time counting means for controlling the operation of the electrical apparatus responsive to the current time corresponding to the target time.

4. A timer according to claim 1, 2 or 3, further comprising reset means for forcibly setting the clock means to the nonactive state.

5. A timer according to claim 4, wherein the reset means includes a manual switch to set the clock to the nonactive state.

6. A timer according to claim 4, further includes a battery to supplying an operating voltage for the timer.

7. A timer according to claim 6, wherein the reset means includes detecting means for detecting a predetermined increase of the operating voltage from the battery and wherein the reset means sets the clock to the nonactive state if the predetermined increase of the operating voltage is detected.

8. A timer according to claim 1, 2 or 3, wherein the timer controls an operating start and end of the electrical apparatus.

9. A timer according to claim 1, 2 or 3, wherein the electrical apparatus is an air conditioner.

10. A remote controller for controlling an operation of an electrical apparatus comprising:

a) a transmitting circuit to transmit a signal to control the electrical apparatus, b) a clock having an active state in which the clock is set to an initial value and is operative therefrom and a nonactive state in which the clock is not set to an initial value, the clock generating a current time in the active state;

c) initial time setting means for setting the initial value of the clock so as to set the clock to the active state;

d) first controlling means for controlling the operation of the electrical apparatus, comprising:

first time designating means for designating a time interval; and first time counting means for counting toward an end of the time interval, and for transmitting a first signal to control the operation of the electrical apparatus at the end of the interval time;

e) second controlling means for controlling the operation of the electrical apparatus, comprising:

second time designating means for designating a target time; and second time counting means for transmitting a second signal to control the operation of the electrical apparatus if the current time corresponds to the target time;

f) activating means for operating the remote controller in a first mode, in which the first controlling means is activated, responsive to the clock being in the nonactive state and for operating the remote controller in a second mode, in which the second controlling means is activated, responsive to the clock being in the active state.

11. A remote controller according to claim 10, further comprising a battery for supplying an operating voltage to the timer.

12. A remote controller according to claim 11, further comprising reset means for forcibly setting the clock to the nonactive state, wherein the reset means includes detecting means for detecting a predetermined increase of the operating voltage, wherein the reset means sets the clock the clock to the nonactive state if the predetermined increase in operating voltage is detected.

13. A remote controller according to claim 10, wherein the timer controls an operating start and end of the electrical apparatus.

14. A remote controller according to claim 10, wherein the electrical apparatus is an air conditioner.

15. A method for controlling an operation of an electrical apparatus using a timer, comprising the steps of:

providing a clock having an active state in which the clock is set to an initial value and is operative and a nonactive state in which the clock is not set to an initial value, the clock generating a current time in the active state;

inputting the initial value to the clock so as to set the clock to the active state;

entering a first operation mode responsive to the clock means being in the nonactive state, the first operation mode including the steps of designating a time interval and controlling the operation of the electrical apparatus at the end of the interval time; and entering a second operation mode responsive to the clock means being in the active state, the second operation mode including the steps of designating a target time and controlling the operation of the electrical apparatus responsive to the current time corresponding to target time.

* * * * *